(12) United States Patent
Combs et al.

(10) Patent No.: US 8,895,643 B2
(45) Date of Patent: *Nov. 25, 2014

(54) COLD-PRESSED MATS OF LIGNOCELLULOSIC MATERIAL HAVING IMPROVED COLD TACK AND A PROCESS FOR THEIR PRODUCTION

(71) Applicant: Bayer MaterialScience LLC, Pittsburgh, PA (US)

(72) Inventors: George G. Combs, McMurray, PA (US); Nigel Barksby, Moon Township, PA (US); Jeffrey F. Dormish, Upper St. Clair, PA (US)

(73) Assignee: Bayer MateralScience LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,543

(22) Filed: Feb. 6, 2013

(65) Prior Publication Data
US 2013/0150489 A1   Jun. 13, 2013

Related U.S. Application Data

(62) Division of application No. 12/894,259, filed on Sep. 30, 2010, now Pat. No. 8,440,747.

(51) Int. Cl.
| | | |
|---|---|---|
| *C08K 11/00* | (2006.01) |
| *C08L 75/04* | (2006.01) |
| *B29C 43/00* | (2006.01) |
| *C08L 97/02* | (2006.01) |
| *C08G 18/76* | (2006.01) |
| *B27N 3/00* | (2006.01) |
| *C08L 7/02* | (2006.01) |

(52) U.S. Cl.
CPC .  *C08L 97/02* (2013.01); *C08L 7/02* (2013.01); *C08L 75/04* (2013.01); *B29C 43/003* (2013.01); *C08G 18/7664* (2013.01); *B27N 3/002* (2013.01)

USPC ............... 524/9; 524/13; 524/14; 524/35

(58) Field of Classification Search
USPC .......................................... 524/9, 13, 14, 35
See application file for complete search history.

(56) References Cited

U.S. PATENT DOCUMENTS

| | | | |
|---|---|---|---|
| 3,931,088 | A | 1/1976 | Sakurada et al. |
| 4,279,788 | A | 7/1981 | Lambuth |
| 5,180,770 | A | 1/1993 | Lepori et al. |
| 5,214,081 | A | 5/1993 | Lepori et al. |
| 8,440,747 | B2 * | 5/2013 | Combs et al. ................ 524/9 |
| 2003/0038394 | A1 | 2/2003 | Haas et al. |
| 2003/0125458 | A1 | 7/2003 | Thiele et al. |
| 2003/0176517 | A1 | 9/2003 | Striewski et al. |
| 2003/0224179 | A1 | 12/2003 | Skinner et al. |
| 2007/0102108 | A1 | 5/2007 | Zheng et al. |
| 2009/0114123 | A1 | 5/2009 | Clark et al. |
| 2013/0005867 | A1 | 1/2013 | Varnell |

FOREIGN PATENT DOCUMENTS

CA        1338075        2/1996

* cited by examiner

Primary Examiner — Edward Cain
(74) Attorney, Agent, or Firm — Robert S. Klemz

(57) ABSTRACT

Cold-pressed mats of lignocellulosic material having a Push Off Test extension equal to at least 85% of that of a mat made with a urea-formaldehyde resin are produced from a lignocellulosic material and binder system. These mats are produced at ambient temperature by separately adding each component of the binder system to the lignocellulosic material, blending the lignocellulosic material and binder system to coat the lignocellulosic material with the binder system, forming the coated lignocellulosic material into the desired form and applying pressure to the formed lignocellulosic material to obtain the desired thickness. The binder system includes: (i) at least one polyfunctional isocyanate and (ii) at least one aqueous dispersion of an adhesive or tackifier.

6 Claims, No Drawings

COLD-PRESSED MATS OF LIGNOCELLULOSIC MATERIAL HAVING IMPROVED COLD TACK AND A PROCESS FOR THEIR PRODUCTION

CROSS REFERENCE

The present application is a Divisional of U.S. Ser. No. 12/894,259, filed Sep. 30, 2010.

FIELD OF THE INVENTION

The present invention relates to mats made with a lignocellulosic material and a binder system which includes a tackifying agent and a polyisocyanate and to a process for the manufacture of such mats. The binder system of the present invention provides excellent cold tack performance. As used herein, "excellent cold tack performance" means that a mat formed at ambient temperature from wood particles or "furnish" and the binder system has sufficient cohesion to maintain its shape and integrity as it moves along a conveyor prior to compression in the final press. The mats formed in accordance with the present invention are subsequently processed into composite products such as plywood, oriented strand board, medium density fiberboard or particle board.

BACKGROUND OF THE INVENTION

For many years, the binders generally used to manufacture engineered wood composite products such as plywood, oriented strand board (OSB), particleboard, or medium density fiberboard have been resins based on urea-formaldehyde, phenol-formaldehyde, or melamine-formaldehyde. These formaldehyde-based resins are relatively low in cost and provide broad processing latitude in mills with different types of production line configurations. In many of the known processes for the production of wood composites, wood pieces, chips, particles, or fibers are treated with binder and then "cold-pressed" into a mat or cake that moves along a conveyor to a high temperature pressing assembly where the loose mat is further compressed into a thin panel and the adhesive properties of the binder are activated.

One of the disadvantages of formaldehyde-based resins is that over time these resins emit formaldehyde into the atmosphere at levels that may have deleterious health consequences when used in confined areas with limited ventilation.

In 2007, the California Air Resources Board (CARB) approved the Airborne Toxic Control Measure (ACTM) requirements for fabricators of composite wood products that are bonded with a resin to produce wood-based panels for interior use. ACTM targets hardwood/plywood composites, particleboard, and medium density fiberboard in which the predominant binder is a formaldehyde-containing resin. Starting with Phase 1 in January of 2009, ACTM limits the level of formaldehyde released from finished goods such as furniture, cabinets, doors, or other items used in the construction of new homes. Full implementation of ACTM takes place in January 2011 for particleboard and medium density fiberboard.

Depending upon the type of mill operation, e.g., whether a continuous or discontinuous process is employed in the production of particleboard, the degree of cohesiveness of the mat formed from the wood particles or "furnish" needed to maintain its shape and integrity as it moves along the conveyor prior to the compression step may vary. Traditional urea-formaldehyde binders are known to impart sufficient cold tack or wood particle cohesion to the mat that relatively high production rates can be achieved. However, isocyanate binders do not exhibit tack comparable to existing commercial systems. Therefore mat integrity is not maintained under some of the more severe continuous mill processing conditions. In such situations, there may be gaps along the conveyor as the mat is lowered from one level to another on its way to the final press. The mat must be sufficiently strong that it will not collapse under its own weight as it extends over the gap before coming in contact with the next belt.

There have been a variety of attempts to address the tack deficiency associated with replacement of urea-formaldehyde binders in wood composites with isocyanate adhesives.

U.S. Pat. No. 3,931,088 teaches that a composition composed of an aqueous solution of polyvinyl alcohol (PVA) and a hydrophobic solution of an isocyanate compound is useful as an adhesive for the production of plywood or particleboard. The disclosed adhesive mixture in this patent is said to provide "an excellent initial adhesive strength". A solvent is used to dissolve the isocyanate compound employed in U.S. Pat. No. 3,931,088, to uniformly disperse the isocyanate compound in the PVA emulsion, and to protect the isocyanate groups from direct contact with water prior to the heat-pressing step. No mention of "tack" is made in this patent and no data comparing the "initial adhesive strength" of the disclosed isocyanate-containing adhesive with any formaldehyde resin system is presented.

Another approach to using isocyanate binders as alternatives to urea-formaldehyde resins is disclosed in U.S. Pat. No. 4,279,788 which teaches that aqueous polyisocyanate-lignin adhesives are useful in the manufacture of wood composites. According to the teachings of U.S. Pat. No. 4,279,788, water in the adhesive composition serves an important plasticizing function, facilitates intimate contact between chip surfaces and provides the "pre-pressing tack needed for cold press mat consolidation". However, no examples or data are presented to demonstrate these alleged advantages. Further, it is not clear to what extent, if any, the cold tack of the disclosed polyisocyanate-lignin adhesive is comparable to or exceeds that of conventional urea-formaldehyde resins.

U.S. Pat. Nos. 5,180,770 and 5,214,081 each discuss the lack of sufficient "green tack" of polyisocyanate binders used in wood composite production. Each of these patents discloses a binder composition composed of an emulsion containing at least one polyisocyanate and at least one water-dispersed acetovinylic resin having a glass transition temperature of less than 5° C. In one embodiment of the process disclosed in this patent, the polyisocyanate may be added to an aqueous dispersion of an acetovinylic polymer to produce an emulsion that is applied to the wood particles. In an alternative method, a polyisocyanate emulsion and an aqueous acetovinylic polymer dispersion are added separately to the wood particles. In either method, the amounts of polyisocyanate emulsion and aqueous acetovinylic polymer dispersion and the processing conditions are such that a mat is produced with green tack cohesion values greater than 1 kg. The green tack is measured by forming 50 mm diameter pellets using 30 grams of the wood pieces or particles treated with the emulsion and applying a load of 500 kg to the treated pellets for 30 seconds. The pellets are tested in a dynamometer and the load at break is observed. No examples comparing the disclosed polyisocyanate/acetovinylic binders with the known urea-formaldehyde resins being replaced are given.

The prior art has not therefore disclosed a polyisocyanate binder composition that can be used to replace resins containing formaldehyde in the production of wood composite products which matches or exceeds the cold tack performance of the known formaldehyde-containing resins.

SUMMARY OF THE INVENTION

The present invention is directed to a cold-pressed mat formed from a lignocellulosic material and a binder system having a Push Off Test (described herein) extension which is at least 85% of that of a mat made with the same lignocellulosic material and a urea formaldehyde resin.

The present invention is also directed to a binder system that includes an isocyanate and a tackifier for the production of a mat made with lignocellulosic materials which matches or exceeds the cold tack performance of urea-formaldehye resins, is economical, and has no-added formaldehye (NAF) resin.

The present invention is further directed to a process for the production of mats of lignocellulosic materials in which the binder systems of the present invention are employed to produce composite articles having internal bond strengths which are not adversely affected despite simultaneous addition of water and isocyanate to the lignocellulose-containing particles or furnish.

DETAILED DESCRIPTION OF THE INVENTION

The present invention will now be described for purposes of illustration and not limitation. Except in the operating examples, or where otherwise indicated, all numbers expressing quantities, percentages, functionalities and so forth in the specification are to be understood as being modified in all instances by the term "about."

The binder system of the present invention includes: (1) at least one polyfunctional isocyanate and (2) at least one aqueous dispersion of a material that has adhesive or tackifying characteristics when contacted with a lignocellulosic material. In the process of the present invention, a cold-pressed mat of lignocellulosic materials is formed by (a) separately adding at least one polyfunctional isocyanate and at least one aqueous dispersion of a material which exhibits adhesive or tackifying characteristics when contacted with a lignocellulosic material in the form of particles, strands or fibers; (b) mixing the polyfunctional isocyanate, the aqueous dispersion, and the lignocellulosic material until the lignocellulosic material is coated with sufficient polyfunctional isocyanate and aqueous dispersion that a mat can be formed from the coated lignocellulosic material; (c) forming the coated lignocellulosic material into a mat; and (d) applying sufficient pressure at ambient temperature to the coated lignocellulosic material formed in (c) to obtain a mat of the desired thickness having improved cold tack performance.

The aqueous dispersion included in the binder system of the present invention and employed in the above-described process is an aqueous dispersion of a material that may be either polymeric or non-polymeric. The material dispersed in this aqueous dispersion must, however, exhibit sufficient adhesive or tackifying characteristics that it will, when used in accordance with the present invention, produce a mat having a mat extension in the Push-Off Test (described below) which is from at least 85% to more than 100% of the mat extension of a mat produced with a conventional urea-formaldehyde resin. Whether a material will exhibit sufficient adhesive or tackifying characteristics when contacted with a lignocellulosic material may be readily determined by simple methods known to those skilled in the art.

Although the prior art teaches that emulsions of the isocyanate and some aqueous adhesive dispersions should be used as a binder, it has surprisingly been found that composites with higher internal bond strengths are obtained when the mat used to produce the composite is formed with a polyfunctional isocyanate (i.e., polyisocyanate) and an aqueous dispersion of tackifying/adhesive composition that have each been added separately to the wood particles or other lignocellulosic material. Internal bond strength is a key specification for composite boards or panels formed from cold-pressed mats made with the binder system of the present invention and the value should be as high as possible.

In addition to wood particles, other lignocelluolosic materials within the scope of the present invention include bark, straw, bamboo, and the like.

The polyisocyanate is generally added to the cellulosic material in an amount of from 1.5% to 10%, preferably, from 1.6% to 6%, based on the dry wood content of particles, strands, or fibers.

The aqueous dispersion is generally added to the cellulosic material in an amount of from 0.02% to 5% dispersion solids, preferably, from 0.30% to 3.0% dispersion solids, based on the dry wood content of particles, strands, or fibers in the composite.

The total amount of polyisocyanate and aqueous dispersion solids added to the cellulosic material will generally be from 1.52% to 15.0% preferably, from 1.90% to 9.0%, based on the dry wood content of the lignocellulosic material used in the process.

Polyfunctional isocyanates that may be used in the binder system of the present invention include: substituted or unsubstituted aromatic, aliphatic, and cycloaliphatic polyisocyanate compounds having at least two isocyanate groups. Suitable aromatic isocyanates include, but are not limited to, 4,4'-diphenylmethane diisocyanate (MDI), polymeric MDI (PMDI), toluene diisocyanate, allophanate-modified isocyanates, naphthalene diisocyanate, isocyanate-terminated prepolymers and carbodiimide-modified isocyanates. Suitable aliphatic and cycloaliphatic isocyanates include, but are not limited to, 1,6-hexamethylene-diisocyanate and its isocyanurate, biuret, uretdione, and allophanate modifications; isophorone diisocyanate and its isocyanurate and allophanate modifications; 2,4- and 2,6-hexahydrotoluenediisocyanate, as well as the corresponding isomeric mixtures; 4,4'-, 2,2'- and 2,4'-dicyclohexylmethanediisocyanate; 1,3 tetramethylene xylene diisocyanate, and prepolymers based on these diisocyanates.

Preferred isocyanates are polymeric derivatives of MDI with average NCO functionalities in the range of from 2.2 to 3.3 and viscosities of from 25-2000 mPas and their prepolymers prepared from polyols or other oligomers or polymers such as polyether or polyester polyols that contain active hydrogen atoms. The most preferred PMDI compounds are those with functionalities in the range of from 2.2 to 3.0 whose viscosities are less than about 800 mPas at 25° C. Polyisocyanates with lower viscosities are advantageous because they facilitate even distribution of the binder system over the surface of the lignocellulosic particles, strands and/or fibers during the mixing step.

The polyfunctional isocyanate(s) may be used in amounts of from 1.5% to 10% by weight, based on the dry wood content of particles, strands, or fibers. The optimum amount of polyisocyanate in the binder system for any particular application will, of course, be dependent upon the performance requirements for the final product. Polyisocyanate levels of from 1.6% to 6% are particularly preferred when the polyisocyanate is polymeric diphenylmethane diisocyanate (PMDI). At least one polyisocyanate is included as one of the components of the binder system of the present invention, but more than one polyisocyanate may be used.

Another component of the binder system of the present invention is at least one aqueous dispersion of a polymeric or non-polymeric compound that has adhesive or tackifying properties when contacted with a lignocellulosic material.

Aqueous dispersions suitable for use in the practice of the present invention include dispersions of: polyurethanes; halogenated vinyl polymers; vinyl alcohol and/or vinyl ester polymers; polymers of acrylic acid and its esters; natural rubber; terpene phenolic resins; rosin esters; and hydrocarbon resins. Dispersions of such materials are available from commercial suppliers of adhesive compositions or tackifier additives used to bind one substrate to another. Aqueous dispersions of aliphatic and aromatic polyurethanes, polyvinyl acetate homo- and co-polymers, chlorinated polybutadienes, polychloroprene (poly-2-chlorobutadiene, 1-3), rosin esters, and hydrocarbon resins are particularly preferred. Representative examples of suitable dispersions include the Dispercoll® U series of polyurethane dispersions based on aliphatic and/or aromatic polyisocyanates and polyester and/or polyether polyols available from Bayer MaterialScience; the Dispercoll® C series of polychloroprene lattices available from Bayer MaterialScience; Tacolyn resin dispersions available from Eastman Chemical Company; and Vinnapas® vinyl acetate-ethylene copolymer dispersions available from Wacker Polymers.

The amount of the aqueous dispersion included in the binder system of the present invention is generally such that the amount of dispersed polymer or resin ranges from 0.02% to 5%, preferably from 0.30% to 3.0% based on dry lignocellulose content. Levels of from 0.50% to 2.0% are even more preferred since better cold tack is obtained at these levels than with conventional urea formaldehyde resins at a relatively lower cost. Blends containing more than one aqueous dispersion may be employed in the practice of the invention.

Use of the binder system of the present invention which includes at least one polyisocyanate and at least one aqueous dispersion of an adhesive or tackifying compound to form a cold-pressed mat of lignocellulosic materials in the process of the present invention improves cold tack by 10% to 35% over urea formaldehyde systems.

The commercially available aqueous dispersions of tackifying compounds are typically supplied at solids contents of greater than about 30%. In the practice of the present invention, sufficient water is added to such commercially available dispersions to promote optimal distribution of the tackifying component over the particle surfaces of lignocellulosic material. More moisture may be added to the wood particles independently of the aqueous dispersion. The total amount of moisture added may be equal to from 1% to 15% by weight, based on the total weight of dry wood or other lignocellulosic material being treated plus water. More preferred amounts of added moisture are from 2% to 10%. Addition of 2.5% to 5% moisture is most preferred.

Catalysts for accelerating the isocyanate addition reaction may, in principle, be included in the binder system of the present invention. The use of catalysts is not, however, necessary. If used, suitable catalysts include: tin compounds such as dibutyl tin dilaurate or tin(II) octoate; and tertiary amines such as triethylene diamine, dimethylethyl amine, pyridine, 4-phenylpropyl pyridine, bis(N,N-dimethylaminoethyl) ether, N,N'-dimethylaminoethyl-N-methyl ethanolamine, N,N-dimethylaminoethyl morpholine, quinoline, morpholine, N-methyl morpholine, etc. Other suitable catalysts are described in "Kunstoff Handbuch", Volume VII, published by Becker and Braun, Carl Hanser Verlag, Munich, 1983 on pages 92-98. The catalyst is used, if at all, in a quantity of about 0.001 to 10% by weight, preferably from about 0.002 to 0.1% by weight, based on the total quantity of polyisocyanate, aqueous dispersion and any other reactive materials present.

Other optional additives and/or auxiliary agents which may be included in the binder system of the present invention include: wax emulsions for reduced water absorption, preservatives, surface active additives (e.g., emulsifiers and stabilizers), mold release agents such as zinc stearate, colorants or pigments, etc. Examples of stabilizing agents which reduce swelling and water absorption are; sodium chloride, sodium sulfate, paraffin, fatty acids and their salts such as zinc stearate and other similar materials. Paraffin and fatty acids and their salts may also serve as release agents. Use of other active materials in the binder system may shorten the pressing time.

As has already been noted, the percentages of ingredients in the wood binder systems of the present invention can vary widely according to needs and conditions of a particular application. In general, however, quantities in the ranges recited above have been found suitable.

Lignocellulosic materials to which the binder system of the present invention may be applied include: wood, wood fibers, wood bark, cork, wheat straw, rice straw, bagasse straw, flax, bamboo, esparto, rice hulls, sisal fibers and coconut fibers. These lignocellulosic materials may have a moisture content of from about 0.5 to about 30% by weight, based on total weight of lignocellulosic material, preferably from about 1.5 to about 8% by weight when used in the production of a mat to be used to produce a composite material.

In the process of the present invention, each component of the binder system is separately added to the lignocellulosic material. It is preferred that the at least one polyfunctional isocyanate and at least one aqueous dispersion of a material having adhesive or tackifying characteristics when contacted with lignocellulosic material be added simultaneously to the lignocellulosic material. However, it is also possible to add one binder component to the lignocellulosic material and then subsequently add the other binder component.

After each of the binder components has been added to the lignocellulosic material, the polyfunctional isocyanate, the aqueous dispersion and the lignocellulosic material are blended until the lignocellulosic material is sufficiently coated with the binder system components that the lignocellulosic material can be formed into the desired shape. The coated lignocellulosic material is then formed into the desired shape, e.g., a mat. Pressure is then applied to the formed lignocellulosic material at ambient temperature to obtain the desired thickness. The amount of pressure applied to the formed lignocellulosic material will generally be sufficient to compress the formed material by at least 20% of its initial thickness, preferably, by from 30 to 40% of its initial thickness.

For the purpose of demonstrating the invention, cold tack was measured using a device adapted from an apparatus described by R. J. Leicht in the Journal of Adhesion, 1998, vol. 25, pages 31-44 to push a pre-pressed mat over the edge of a table assembly so that the length at which the mat breaks defines the cold tack performance of the binder used to prepare the mat. This test for measuring cold tack described below is referred to herein as the "Push Off Test".

In the Push Off test, the modified device used to measure cold tack as reported in the examples below, consisted of a hydraulic cylinder connected to an electric motor that was attached to a wooden platform. A polytetrafluoroethylene "T" was affixed to the end of the cylinder pushrod. An unpressed mat was prepared by uniformly adding enough treated wood particles or furnish to reach a height of 2 inches (5 cm) in a wooden form positioned on a metal plate covered with a smooth polyethylene film sheet. A flat-topped wooden insert that fit snugly into the form was placed on top of the furnish and the metal plate holding the form and furnish was placed under a Power Pod C-press from Black Brothers Company. The press was equipped with two air pods pressurized to 90 psi to create a calculated total force of 280 psi applied for 90 seconds to form a 9"×6"×1" (22.9 cm×15.2 cm×2.5 cm) pressed mat. The mat on the plastic-covered metal plate was placed in front of the pushrod and the edge of the mat was aligned with the edge of the platform using the motorized hydraulic cylinder. A timer and a programmed push at the rate of 1.67 inches (4.2 cm) per minute were started simultaneously. The time for the first break in the mat and the weight of material that fell onto the balance were recorded. The maximum total travel distance for the pushrod was 3.00 inches after 110 seconds. In the examples which follow, the time until first break of a urea formaldehyde resin-treated mat used as the control is defined as 100% extension. The time until the first break of each of the exemplified binder compositions of the present invention was normalized to this value.

EXAMPLES

The present invention is further illustrated, but is not to be limited, by the following examples. All quantities given in "parts" and "percents" are understood to be by weight, unless otherwise indicated.

General Procedure for Application of Binder o Wood Particles

The furnish typically used to make core sections of particleboard panels was obtained from commercial mills and dried to the desired moisture content or the "initial moisture" values shown in the Tables. Sufficient furnish was transferred to the bowl of a Kitchen Aid mixer so that the total weight of furnish plus any moisture added during the mixing step was equal to 360 grams. The individual components of the binder system (i.e., the polyisocyanate and the aqueous dispersion) were added to the wood particles using a syringe for uniform distribution while slowly mixing at the mixer's lowest speed. In the following examples, the two component binder systems were added using a syringe for the isocyanate and a separate syringe for the aqueous dispersion of tackifying agent. The amount of isocyanate and actual amount of tackifier solids from the dispersion are expressed as weight percent based on the calculated dry wood content of the furnish. Any added water from any source was counted to determine the total "final moisture" present in the formulation as shown in the Tables. The two syringes were discharged simultaneously and evenly over the furnish while mixing for one minute. After addition of the binder system components was completed, the mixing speed was increased to the next highest setting and the mixture was blended for 3 minutes. The treated furnish was then sprinkled by hand into a 9 inch (22.9 cm) by 6 inch (15.2 cm) wooden form and any large or oversized chips were removed as the layers were built up and smoothed to a uniform height of about 2 inches (5 cm). The mat was placed in the press and subjected to 280 psi (19.7 kg/cm$^2$) of force for 90 seconds before immediately testing the formulation's cold tack as previously described.

Urea-Formaldehyde Resin Binder Control

Aqueous urea-formaldehyde (UF) resin dispersions containing 60% to 65% "solids" were obtained from commercial mills and used to prepare pressed mats that contained 6% UF based on dry wood particles and about 8% to 9% total final moisture. It should be noted that different lots or batches of wood particles may interact differently with the resin binder. We use the term "difficult furnish" in those cases where more resin must be used to obtain a given level of tack or the same level of resin results in a lower tack value. A new control experiment was done with UF resins whenever new batches of furnish were tested for cold tack.

Binder System A

Component 1—Polymeric diphenylmethane diisocyanate having an NCO content of 31.5% and a viscosity at 25° C. of 200 mPa·s which is commercially available under the name Mondur® 541 from Bayer MaterialScience LLC.

Component 2—An aqueous 40% solids dispersion of a crystalline aliphatic polyester polyurethane which is commercially available under the name Dispercoll® U53 from Bayer MaterialScience LLC.

Binder System B

Component 1—Polymeric diphenylmethane diisocyanate having an NCO content of 31.5% and a viscosity at 25° C. of 200 mPa·s which is commercially available under the name Mondur® 541 from Bayer MaterialScience LLC.

Component 2—An aqueous 35% solids aliphatic polyurethane dispersion containing crystalline and amorphous polyester segments which is commercially available under the name Dispercoll® U XP 2673/1 from Bayer MaterialScience LLC.

Binder System C

Component 1—Polymeric diphenylmethane diisocyanate having an NCO content of 31.5% and a viscosity at 25° C. of 200 mPa·s which is commercially available under the name Mondur® 541 from Bayer MaterialScience LLC.

Component 2—An aqueous 58% solids dispersion of a crystalline polychloroprene which is commercially available under the name Dispercoll® C 84 from Bayer MaterialScience LLC.

Binder System D

Component 1—Polymeric diphenylmethane diisocyanate having an NCO content of 31.5% and a viscosity at 25° C. of 200 mPa·s which is commercially available under the name Mondur® 541 from Bayer MaterialScience LLC.

Component 2—An aqueous 55% solids dispersion of a rosin ester which is commercially available under the name Tacolyn 3100 from Eastman Chemical Company.

Binder System E

Component 1—Polymeric diphenylmethane diisocyanate having an NCO content of 31.5% and a viscosity at 25° C. of 200 mPa·s which is commercially available under the name Mondur® 541 from Bayer MaterialScience LLC.

Component 2—An aqueous 40% solids dispersion of an amorphous polyether polyurethane which is commercially available under the name Dispercoll® U XP 2643 from Bayer MaterialScience LLC.

Binder System F

Component 1—Polymeric diphenylmethane diisocyanate having an NCO content of 31.5% and a viscosity at 25° C. of 200 mPa·s which is commercially available under the name Mondur® 541 from Bayer MaterialScience LLC.

Component 2—An aqueous 55% solids dispersion of a vinyl acetate-ethylene copolymer with a Tg of 14° C. which is commercially available under the name Vinnepas® 320 from Wacker Polymers.

Binder System G

Component 1—Polymeric diphenylmethane diisocyanate having an NCO content of 31.5% and a viscosity at 25° C. of 200 mPa·s which is commercially available under the name Mondur® 541 from Bayer MaterialScience LLC.

Component 2—An aqueous 55% solids dispersion of a vinyl acetate-ethylene copolymer with a Tg of 0° C. which is commercially available under the name Vinnepas® 400 from Wacker Polymers.

Binder System H

Polymeric diphenylmethane diisocyanate having an NCO content of 31.5% and a viscosity at 25° C. of 200 mPa·s which is commercially available under the name Mondur® 541 from Bayer MaterialScience LLC.

General Procedure for Making Hot-Pressed Panel Composites

About 2500 grams of furnish dried to the initial moisture content reported in the Tables were added to a Lodige Ploughshare® batch mixer equipped with a set of fixed metal paddles along the cylinder axis. Bayer's Mondur 541 polyisocyanate alone or in combination with a diluted aqueous dispersion of a polymeric or nonpolymeric tackifier followed by the isocyanate was/were sprayed into the tumbling furnish via a slightly pressurized port and blended for about two minutes. The furnish was dried to the final moisture content reported in the Tables. In the Examples where Mondur 541 polyisocyanate was added to diluted Vinnepas® 400 dispersion, the binder system components were mixed with high shear just prior to adding the isocyanate/polymer emulsion to the furnish in the blender. The final moisture content reported in the Tables for the mats was based on total dry furnish weight plus water. The isocyanate level in all mats reported in the Tables was based on dry furnish weight. In each example, a sample of treated furnish was subjected to a cold tack measurement in accordance with the Push Off Test described previously. Some Examples were done with warm furnish to mimic summer temperatures in Southern mills. In these Examples, the furnish was heated for 20 minutes at 180° F. (82.2° C.) in an oven to bring the wood temperature to 110° F. (43.3° C.) to 115° F. (46.1° C.). After the furnish was treated with the binder system, it was placed back in the oven for another 15 minutes to raise the wood temperature back to 110° F. (43.3° C.) to 115° F. (46.1° C.). A 14" (35.6 cm)×14" (35.6 cm) form was placed on a metal caul plate that had been lightly sprayed with a release agent and sufficient furnish is sprinkled by hand into the form to make a panel that is 0.5 inches (1.25 cm) thick with a density of 50 (0.8 g/cm$^3$) to 55 pcf (0.88 g/cm$^3$) after hot pressing. Debris or large chips were removed as the furnish was layered into the form. The furnish was hand-pressed into a mat using a wooden panel that fit snugly into the 14" (35.6 cm)×14" (35.6 cm) form. A metal screen sprayed with a release agent was placed on top of the mat and the entire assembly was placed into a heated press. Sufficient heat and pressure were applied to make sure that the core temperature of the furnish was slightly above 212° F. (100° C.) for at least one minute and that the final thickness of the composite panel removed from the press is approximately 0.5 inches (1.25 cm). In the Examples, heat and pressure were applied to the mat for about 185 seconds.

TABLE 1

Performance of Binder System with 1.5% Tackifier

| Example | 1* | 2[a] | 3[a] | 4 | 5 | 6 |
|---|---|---|---|---|---|---|
| Binder | UF[1] | H | H | A | B | C |
| Isocyanate Level | 3.4% | 3.4% | 3.4% | 3.4% | 3.4% | 3.4% |
| Initial Moisture | 5.3% | 10.6% | 5.3% | 3.1% | 3.0% | 3.0% |
| Final Moisture | 8.0% | 10.6% | 10.0% | 11.0% | 11.0% | 11.0% |
| Tackifier Level | 0.0% | 0.0% | 0.0% | 1.5% | 1.5% | 1.5% |
| % Extension[2] | 100% (89 sec) | 75% | 89% | 95% | 112% | 100% |
| Mat Length @ Break (cm) | 6.3 | 4.7 | 5.6 | 6.0 | 7.1 | 6.3 |

*Control
[a]Comparative Example
[1]UF = urea formaldehyde
[2]% Extension compared to Extension of Control in Push Off Test

TABLE 2

Performance of Binder System With Less Than 1.0% Tackifier

| Example | 7* | 8 | 9 | 10 | 11 | 12 | 13 |
|---|---|---|---|---|---|---|---|
| Binder | UF[1] | A | A | A | D | D | D |
| Isocyanate Level | 0.0% | 2.0% | 2.0% | 2.0% | 2.0% | 2.0% | 2.0% |
| Initial Moisture | 5.0% | 7.8% | 7.8% | 7.8% | 7.1% | 7.1% | 7.1% |
| Final Moisture | 8.0% | 10.0% | 10.0% | 10.0% | 10.0% | 10.0% | 10.0% |
| Tackifier Level | 0.0% | 0.15% | 0.075% | 0.04% | 0.15% | 0.075% | 0.040% |
| % Extension[2] | 100% (74.5 sec) | 117% | 130% | 124% | 134% | 136% | 133% |
| Mat Length @ Break (cm) | 5.3 | 6.1 | 6.8 | 6.5 | 7.1 | 7.2 | 7.0 |

*Control
[1]UF = urea formaldehyde
[2]% Extension compared to Extension of Control in Push Off Test

TABLE 3

Comparison of Binder Systems Used with Difficult Furnish

| Example | 14* | 15 | 16 | 17 | 18* | 19 | 20 | 21 |
|---|---|---|---|---|---|---|---|---|
| Binder | UF[1] | A | A | A | UF[1] | F | F | F |
| Isocyanate Level | 0.0% | 2.2% | 2.2% | 2.2% | 0.0% | 2.2% | 2.2% | 2.2% |
| Initial Moisture | 3.9% | 3.9% | 3.9% | 3.9% | 4.7% | 4.7% | 4.7% | 4.7% |
| Final Moisture | 7.0% | 7.6% | 7.6% | 7.6% | 8.4% | 8.4% | 8.4% | 8.4% |
| Tackifier Level | 0.0% | 0.30% | 0.60% | 0.97% | 0.0% | 0.30% | 0.60% | 0.97% |
| % Extension[2] | 100% | 86% | 101% | 98% | 100% | 87% | 99% | 103% |

*Control
[1] UF = urea formaldehyde
[2] % Extension compared to Extension of Control in Push Off Test

TABLE 4

Comparison of Binder Systems Used with Difficult Furnish

| Example | 22* | 23 | 24 | 25 | 26* | 27 | 28 | 29 |
|---|---|---|---|---|---|---|---|---|
| Binder | UF[1] | E | E | E | UF[1] | G | G | G |
| Isocyanate Level | 0.0% | 2.2% | 2.2% | 2.2% | 0.0% | 2.2% | 2.2% | 2.2% |
| Initial Moisture | 6.0% | 6.0% | 6.0% | 6.0% | 5.5% | 5.5% | 5.5% | 5.5% |
| Final Moisture | 9.0% | 9.0% | 9.0% | 9.0% | 8.5% | 8.5% | 8.5% | 8.5% |
| Tackifier Level | 0.0% | 0.30% | 0.60% | 0.97% | 0.0% | 0.30% | 0.60% | 0.97% |
| % Extension[2] | 100% | 82% | 81% | 98% | 100% | 82% | 90% | 99% |

*Control
[1] UF = urea formaldehyde
[2] % Extension compared to Extension of Control in Push Off Test

TABLE 5

Performance of Binder Systems in Production of 14" × 14" Panels with Mats pressed under ambient conditions

| Example | 30* | 31 | 32 | 33 | 34 | 35 |
|---|---|---|---|---|---|---|
| Binder | H | G | G | F | E | G[4] |
| Isocyanate Level | 2.2% | 2.2% | 2.2% | 2.2% | 2.2% | 2.2% |
| Initial Moisture | 9.0% | 5.5% | 5.5% | 5.5% | 5.5% | 5.5% |
| Final Moisture | 9.0% | 9.0% | 9.0% | 9.0% | 9.0% | 9.0% |
| Tackifier Level | 0.0% | 0.60% | 0.97% | 0.97% | 0.97% | 0.97% |
| Time @ Break[3] (sec) | <60 | 97 | 94 | 80 | 81 | >150 |
| Internal Bond Strength (psi) [N/mm$^2$] | (198) [1.37] | (149) [1.03] | (170) [1.17] | (173) [1.19] | (154) [1.06] | (113) [0.78] |

*Comparative
[3] Time at which mat broke
[4] Binder System G in the form of an emulsion

TABLE 6

Panels from Mats Produced with Wood Treated at 110° F. (43.3° C.) for 15 minutes

| Example | 36 | 37 | 38 |
|---|---|---|---|
| Binder | G | G | G[4] |
| Isocyanate Level | 2.2% | 2.2% | 2.2% |
| Initial Moisture | 5.5% | 5.5% | 5.5% |
| Final Moisture | 12.0% | 12.0% | 12.0% |
| Tackifier Level | 0.60% | 0.97% | 0.97% |
| Time @ Break[3] (sec) | 106 | >150 | >150 |

TABLE 6-continued

Panels from Mats Produced with Wood Treated at 110° F. (43.3° C.) for 15 minutes

| Example | 36 | 37 | 38 |
|---|---|---|---|
| Internal Bond Strength (psi) [N/mm$^2$] | (142) [0.98] | (119) [0.82] | (73) [0.50] |

[3]Time at which mat broke
[4]Binder System G in the form of an emulsion

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A cold-pressed mat of a lignocellulosic material having a Push Off Test extension equal to at least 85% of that of a mat made with a urea-formaldehyde resin, which is produced at ambient temperature by a process comprising:
   (a) separately adding each component of a binder system comprising:
      (i) a polymeric derivative of diphenylmethane diisocyanate or a prepolymer of a polymeric derivative of diphenylmethane diisocyanate having an NCO functionality of from 2.2 to 3.3 and a viscosity of from 25 to 2,000 mPas
      and
      (ii) at least one aqueous dispersion of a material having adhesive or tackifying characteristics when contacted with lignocellulosic material to the lignocellulosic material;
   (b) blending each of the components of the binder system and the lignocellulosic material until the lignocellulosic material is sufficiently coated with the binder system components that the lignocellulosic material can be formed into a mat;
   (c) forming the coated lignocellulosic material into a mat; and
   (d) applying sufficient pressure to the mat at ambient temperature to form a mat having a desired thickness.

2. The mat of claim 1 in which the polyfunctional isocyanate is polymeric diphenylmethane diisocyanate.

3. The mat of claim 1 in which the aqueous dispersion comprises an aqueous dispersion of a polyurethane, a halogenated vinyl polymer, a vinyl alcohol polymer, a vinyl ester polymer, a polymer of acrylic acid, a polymeric ester of acrylic acid, a natural rubber, a terpene phenolic resin, a rosin ester, or a polymeric hydrocarbon resin.

4. The mat of claim 1 in which the amount of aqueous dispersion used is from 0.02 to 5% by weight, based on dry lignocellulose content.

5. The mat of claim 1 in which the pressure applied in (d) is sufficient to compress the mat formed in (c) by 30-40% of its initial thickness.

6. A binder system that imparts cold tack to a mat formed by cold pressing a lignocellulosic material having a Push Off Test extension that is at least 85% of that of a mat made with a urea formaldehyde resin comprising:
   a) a polymeric derivative of diphenylmethane diisocyanate or a prepolymer of a polymeric derivative of diphenylmethane diisocyanate having an NCO functionality of from 2.2 to 3.3 and a viscosity of from 25 to 2,000 mPas and
   b) at least one aqueous dispersion of a polymeric material or non-polymeric compound having adhesive or tackifying characteristics when contacted with a lignocellulosic material, provided that the polymeric material is not a vinyl acetate polymer or a copolymer dispersion with a glass transition temperature less than about 5° C.

* * * * *